United States Patent [19]

Guggi et al.

[11] 4,030,615

[45] June 21, 1977

[54] MANIPULATOR FOR MOVEMENT OF ARTICLES IN A CONTROLLED ENVIRONMENT CHAMBER, ESPECIALLY A HIGH VACUUM CHAMBER

[75] Inventors: Diether Josef Guggi, Aachen; Rolf Klein, Julich, both of Germany

[73] Assignee: Kernforschungsanlage Julich Gesellschaft mit beschrankter Haftung, Germany

[22] Filed: Aug. 5, 1975

[21] Appl. No.: 602,148

[30] Foreign Application Priority Data

Aug. 6, 1974 Germany .......................... 2437735

[52] U.S. Cl. .............. 214/1 BB; 74/18.1; 214/1 BC; 214/1 BD; 214/1 CM
[51] Int. Cl.² ........................................ B65G 47/90
[58] Field of Search .............. 214/1 CM, 1 B, 1 BB, 214/1 BC, 1 BD, 1 R; 74/18.1

[56] References Cited

UNITED STATES PATENTS

| 2,756,857 | 7/1956 | McCorkle | 214/1 CM X |
| 2,973,107 | 2/1961 | Cherel | 214/1 CM |
| 2,996,330 | 8/1961 | Hutto | 214/1 CM X |
| 3,173,555 | 3/1965 | Kaye | 214/1 CM |
| 3,426,920 | 2/1969 | Chesley | 214/1 CM |

FOREIGN PATENTS OR APPLICATIONS

| 72,209 | 3/1960 | France | 214/1 CM |
| 1,925,152 | 11/1970 | Germany | 214/1 CM |
| 117,241 | 2/1959 | U.S.S.R. | 214/1 CM |

*Primary Examiner*—Frank E. Werner
*Attorney, Agent, or Firm*—Walter Becker

[57] ABSTRACT

A manipulator for movement of articles in a controlled environment chamber, especially a high vacuum chamber, in which a bellows has one end sealingly connected to a wall of the chamber and has a cover sealingly connected to the other end with a closed sleeve in the cover and also sealingly connected to the other end of the bellows. A ball is located in about the center of the bellows and a ball cup supporting the ball is fixed to the wall of the chamber. The connection of the ball cup and the bellows to the chamber wall is advantageously by means of a flange. A manipulator rod is slidable in the ball and one of the ball and rod is rotatable. Magnetic means on the manipulator rod in the sleeve is coupled to magnet means outside the sleeve and by manipulation of the magnet means the rod can be reciprocated and rotated. The cover is provided with extensible supports connected between the cover and the flange for tilting the cover together with the sleeve and manipulator rod on the flange. Electric motors are preferably provided for actuating the extensible supports and for reciprocating the magnet in the housing and for rotating the magnet in the housing.

8 Claims, 4 Drawing Figures

MANIPULATOR FOR MOVEMENT OF ARTICLES IN A CONTROLLED ENVIRONMENT CHAMBER, ESPECIALLY A HIGH VACUUM CHAMBER

The present invention relates to a manipulator for moving articles arranged in a high vacuum chamber, which comprises a manipulating bar that extends through a bellows which closes the high vacuum chamber in a gas-tight manner relative to the outside chamber, and which furthermore comprises moving means which are frictionally connected to the manipulating bar and are intended for the latter while on said bellows there is provided on one hand a flange connected to a wall of the high vacuum chamber and on the other hand an outer cover which closes off the chamber encased by said bellows in a vacuum-tight manner. The manipulator furthermore includes a ball joint supported by said flange and comprising a ball cup connected to said flange and a joint ball movable in said ball cup and passed through by the manipulating bar.

With manipulators of this type, movements of articles are effected from the outside chamber in high vacuum chambers. The manipulators are so arranged that the articles can by means of said manipulators be displaced linearly and also be turned and pivoted in three dimensions. Particularly when movements are involved as for instance when actuating microscales installed in high vacuum chambers, a simple adjustability and handling of the manipulators is desired.

A publication by M. Pollermann "Bauelemente der physikalischen Technik", Springer Publication, Berlin, 1972 pages 178–187 (186) discloses a series of manipulators by means of which movements can at least partially be carried out in a high vacuum chamber. For each individual type of movement such as a linear displacement, rotary movement and pivoting movement, the manipulators are equipped with separate actuating means each of which has to be used individually for actuating a manipulating bar of the manipulator. The handling of these manipulators is, therefore, rather awkward.

With one manipulator set forth on page 186 of the above mentioned publication by Pollermann, which serves for centering an electrode in a high vacuum chamber, the manipulating bar passed through a bellows is displaceable by means of a manually adjustable screw drive in the direction of its axis and by means of an adjusting device operable separately is pivotable. For purposes of journalling the manipulating bar, two ball joints are provided the balls of which are passed through by the manipulating bar. The manipulating bar is connected to an outer cover for the bellows which outer cover tightly closes the vacuum chamber. This arrangement has the drawback that by means of this manipulator longitudinal displacements of the manipulating bar can be carried out only with a deformation of the bellows, and that the three-dimensional angular adjustment of the manipulating bar is relatively small particularly in view of the fact that the angular adjustment is dependent on the deformation of the bellows which consists of metal and which can be pivoted all the less the more it is compressed.

It is, therefore, an object of the present invention to provide a manipulator by means of which the movements required in a high vacuum chamber can be carried out without complicated manipulation techniques.

It is another object of this invention to provide a manipulator as set forth in the preceding paragraph, in which all three types of movements can be carried out simultaneously.

It is still another object of this invention to provide a manipulator which will permit wide pivoting movements.

These and other objects and advantages of the invention will appear more clearly from the following specification in connection with the accompanying drawings, in which.

Figure 1:
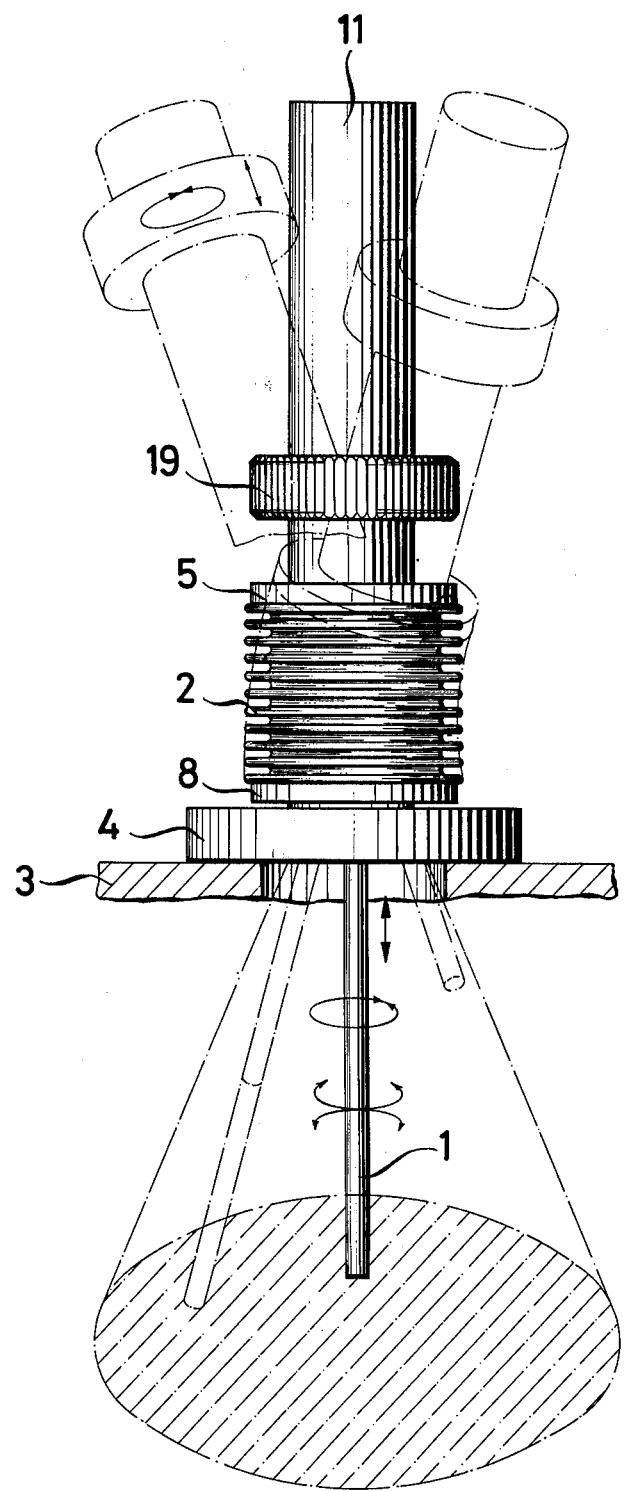
FIG. 1 illustrates a manually adjustable manipulator adjustable to various positions of movement.

The manipulator according to the present invention is characterized primarily in that the outer cover comprises guiding means for the manipulating bar, which guiding means extends into the outer chamber and surrounds in a vacuum-tight manner that end of the manipulating bar which extends from the high vacuum chamber through the ball joint, while that end of the manipulating bar which is surrounded by the guiding means is provided with a magnetic section which is frictionally connected to a magnet that is displaceable in axial direction of the manipulating bar on the outer wall side of the guiding means and is rotatable about the axis of the manipulating bar, said manipulator furthermore being characterized in that the ball joint is arranged within the chamber surrounded by the bellows while the joint ball comprises supporting means for the bellows and the manipulating bar is movably passed through said supporting means as well as through the outer cover of the bellows.

By means of the manipulator according to the invention as set forth above, all necessary types of movements can be carried out advantageously at the same time. Thus, for instance, during a pivotal movement of the guiding means for the manipulating bar with the movement carried out from the outer chamber, it is possible by simultaneous displacement and rotation of the magnet to bring about that the manipulating bar can by integrated movement effect the required handling of the articles in the high vacuum chamber. Inasmuch as the manipulating bar is in a vacuum-tight manner surrounded by the guiding means arranged on the outer cover of the bellows, and is movably passed through the said cover as well as through the support for the bellows, which support is mounted on the joint ball, the bellows will during a displacement in axial direction as well as during rotary movement of the manipulating bar remain unloaded. The bellows will be stressed merely when the manipulating bar is pivoted, in which instance, due to the arrangement of the ball joint within the chamber surrounded by the bellows, the pivotability of the bellows is taken advantage of to an optimum extent. An optimum exploitation of the pivotability of the bellows is according to a further development of the invention realized by the fact that the ball joint is arranged centrally in the chamber surrounded by the bellows.

A further advantageous design of the invention consists in that the magnetic section of the manipulating bar is covered by a high grade steel foil. The high grade steel foil serves for covering the magnetic section of the manipulating bar because with the manipulator according to the invention, that end of the manipulating bar which is surrounded by the guiding means is in the same manner as all other parts of the manipulating bar surrounded by a high vacuum.

In order to enable a remote control of the manipulator, it is provided in conformity with a further development of the invention that two spacers are provided which are variable as to their length and while being offset relative to each other by an angle of 90° are located in spaced relationship to the flange and the outer cover and comprise a screw and a nut. By mounting the spacers in universal joints and their offset arrangement by 90°, it will be realized in an advantageous manner that each pivoting movement of the manipulating bar in a high vacuum is adapted to be carried out either by a change in length of one of the spacers or by a simultaneous change in length of both spacers. For purposes of effecting a change in length, the screws or nuts are coupled to drives which bring about a relative movement between the screw and the nut.

For purposes of remote controlling the displacement of the manipulating bar in axial direction, it is expedient to arrange a rotatably journalled threaded spindle parallel to the axis of the manipulating bar. The said threaded spindle members with a threaded part operable to displace the magnet in axis-parallel direction with respect to the manipulating bar. A turning of the manipulating bar about its axis is brought about by the fact that the magnet is in a housing journalled for rotation about the axis of the manipulating bar and through the intervention of a gear ring connected to the magnet is in operative connection with a gear transmission, said housing comprising the threaded part which is in mesh with the threaded spindle. The above features make it possible that an axial displacement of the magnet and a rotary movement can be carried out independently of each other individually as well as simultaneously. In this connection, according to a further development of the invention, the gear ring meshes with a pinion which is journalled for displacement in axial direction on a rotatable shaft with a cross section different from a circular contour. During a rotation of said shaft, the manipulating bar is through said pinion, gear ring, and magnet rotated about its axis in an advantageous manner independently of the respective displacement of the manipulating bar occurring at the time.

Referring now to the drawings in detail, the manipulator comprises a manipulating bar 1 which passes through a bellows 2. The bellows seals the high vacuum chamber in a gas-tight manner relative to the outer chamber. To this end, the bellows 2 has arranged therein on one hand a flange 4 which is connected to a wall 3 surrounding the high vacuum chamber and on the other hand has arranged thereon an outer cover 5 which closes off in a vacuum-tight manner the chamber surrounded by the bellows 2. The manipulating bar 1 is movably mounted in a ball joint 6, 7 which comprises a joint ball 6 through which the manipulating bar 1 extends and furthermore comprises a ball cup 7. In the illustrated embodiments, the ball cup 7 is held in its position by a bearing support 8 which is connected to flange 4 and which closes in a vacuum-tight manner the bellows 2 on that side thereof which faces toward the wall 3. In order to best take advantage of the pivotability of the bellows 2, the ball joint 6, 7 is in an advantageous manner centrally arranged within the chamber surrounded by the bellows 2.

The joint ball 6 of the ball joint 6, 7 has that side thereof which faces away from the ball cup 7 provided with a support 9 for the bellows 2. The support 9 is frictionally connected to a centering ring 10 which is centrally arranged in guiding means 11 for the manipulating bar, which guiding means is in a vacuum-tight manner connected to the cover 5. The centering ring 10 and the bearing support 8 have recesses 12 so that the same pressure condition as in the high vacuum chamber will prevail in the chamber surrounded by the bellows 2 as well as in the inner chamber of the guiding means 11.

Figure 2:
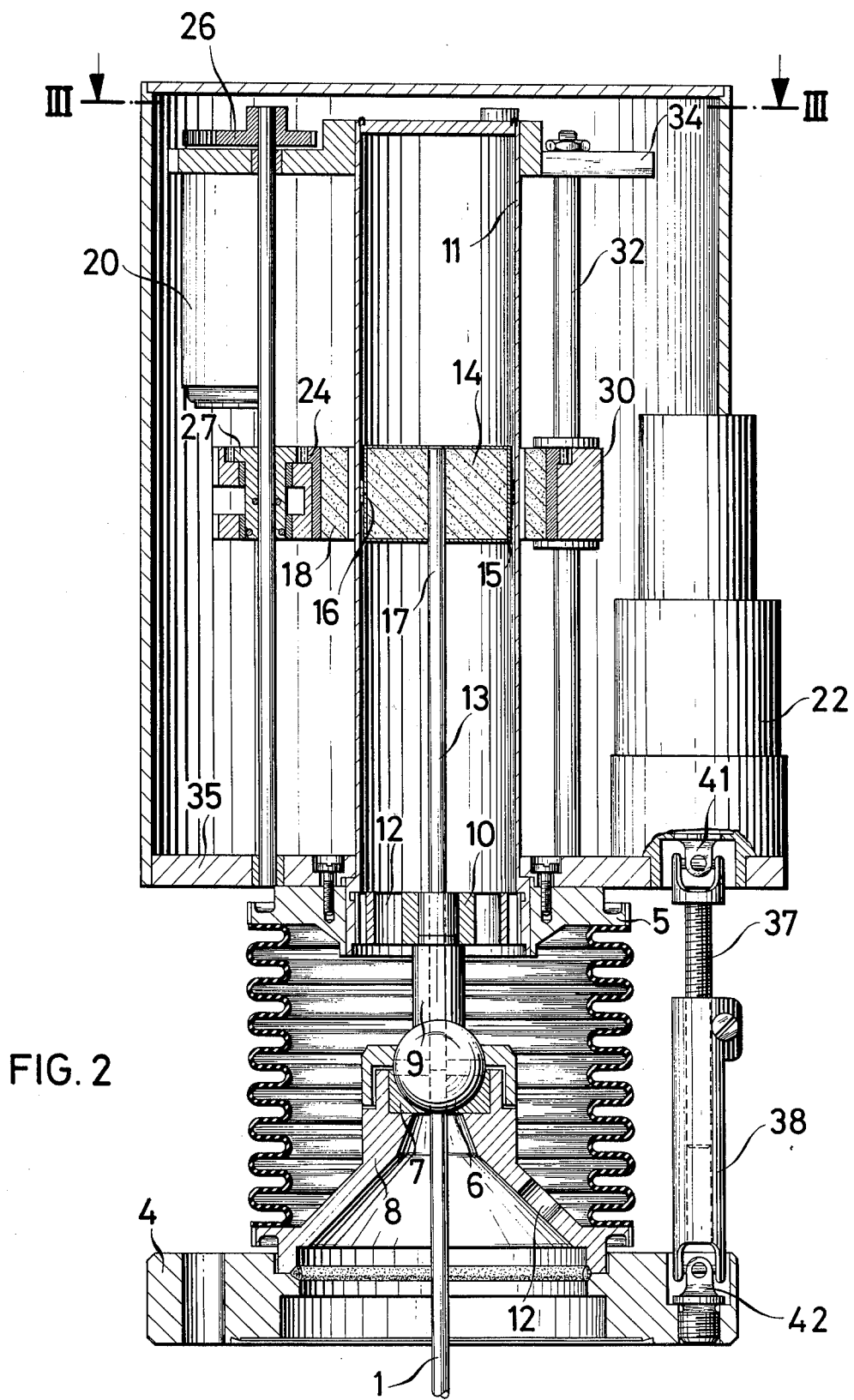
FIG. 2 is a longitudinal section through a manipulator intended for remote control, said section being taken along the line II — II of FIG. 3.

According to the present invention, the guiding means 11 surrounds that end 13 of the manipulating bar 1 which movably passes from the high vacuum chamber through the ball joint 6, 7, the support 9, and the outer cover 5. At the end 13 of the manipulating bar there is provided a magnetic section 14 which in the embodiment of FIG. 2 is in its simplest form formed by a magnet arranged on the manipulating bar 1. This magnet, for protecting the high vacuum chamber, is expediently covered by a high grade steel foil 15 which covers the surface of said magnet. In the embodiment shown in the drawing, the end 13 of the manipulating bar 1 is movably held in the guiding means 11 by means of a slide ring 16 arranged between the magnetic section 14 and the inner wall of the guiding means 11.

Frictionally connected to the magnetic section 14 is (in the specific embodiment shown) an annular magnet 18 which is displaceable on the outer wall side of guiding means 11 in the direction of the axis 17 of the manipulating bar 1 and which is rotatable about the axis 17. With the manually operable manipulating bar according to FIG. 1, a knurled sleeve 19 surrounds the annular magnet 18. A turning of sleeve 19 or displacement on the guiding means 11 brings about that the manipulating bar 1 is in the high vacuum chamber turned or displaced in the same direction. In FIG. 1 dash lines indicate that a pivoting of the guiding means 11 brings about a corresponding pivoting of the manipulating bar 1. By means of the manipulator according to the invention, it is possible in an advantageous manner simultaneously to carry out all types of movements of the manipulating bar 1 while the handling is simple and while the manipulating bar 1 carries out each required movement in an integrated manner.

Figure 3:
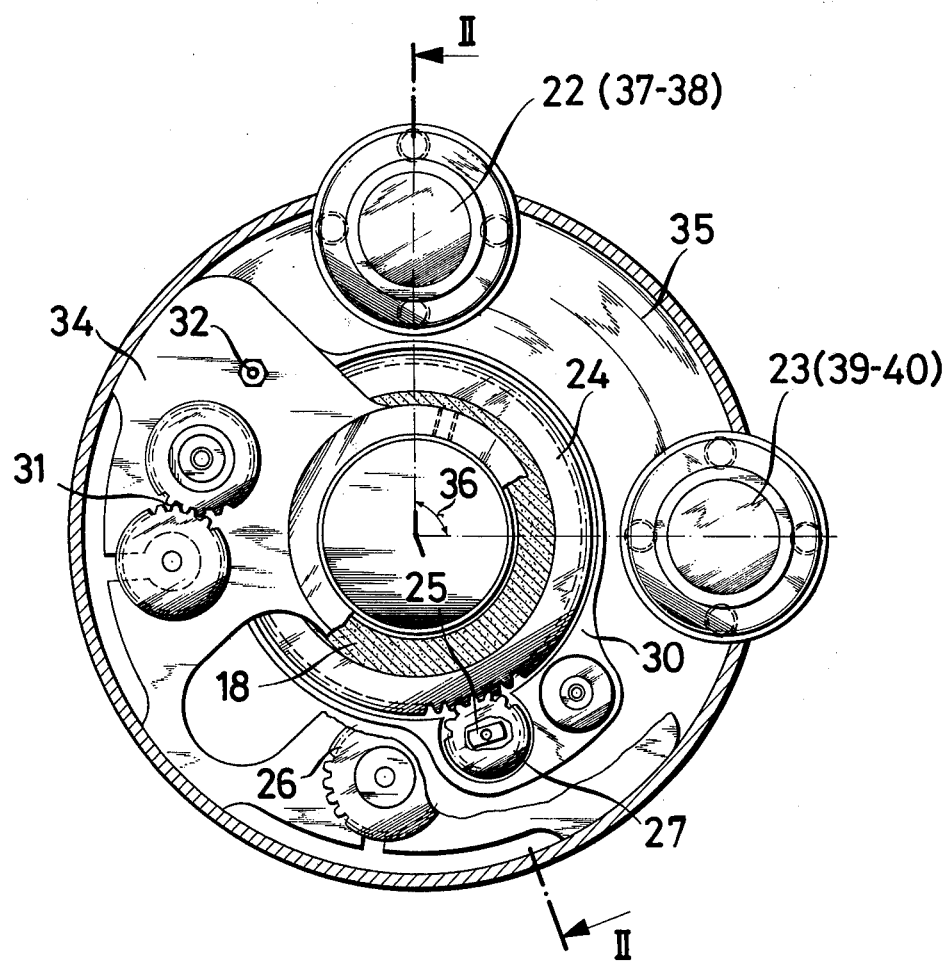
FIG. 3 is a cross section through a manipulator according to FIG. 2, said section being taken along the line III — III of FIG. 2.

For a remote control of the manipulator, mechanical drives are provided which are operated by electric motors 20, 21, 22, 23. A rotation of the magnet 18 about the axis 17 of the manipulating bar 1 is realized by driving a gear ring 24 which is connected to a magnet 18. The gear ring 24 meshes with a pinion 27 which is journalled on shaft 25 and which is driven by the electric motor 20 through a gear transmission 26. As illustrated in FIG. 3, the shaft 25 has a cross section which differs from a circular cross section so that the pinion 27 while being carried along during a rotary movement of shaft 25 is in an advantageous manner independently of the turning movement axially displaceable on shaft 25.

Figure 4:
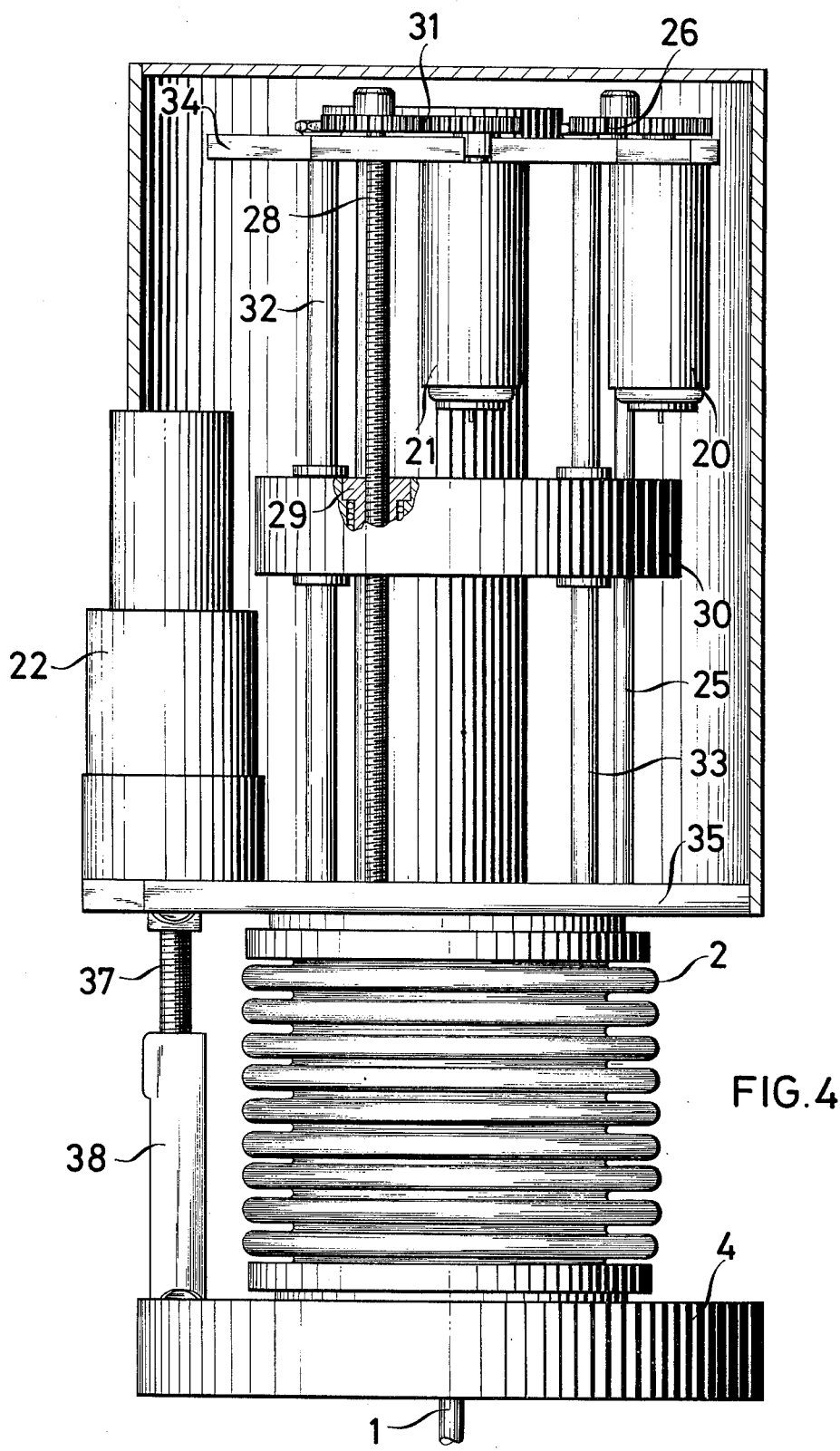
FIG. 4 represents a side view of the manipulator of FIG. 3.

For purposes of displacing the magnet 18 in the direction of the axis 17 of the manipulating bar 1, there is provided a threaded spindle 28 which is rotatably mounted and which is parallel to the axis 17. This spindle 28 meshes with a threaded part 29 on housing 30. For purposes of compensating for any play, the threaded part 29 is by means of a spring continuously pressed against the thread of the threaded spindle 28. The magnet 18 is rotatably journalled in housing 30. The threaded spindle 28 is driven by an electric motor 21 through a gear transmission 31 (see FIG. 4). For guiding the housing 30, guiding bars 32, 33 are guided which are connected to supporting plates 34, 35. Connected to said supporting plates 34, 35 are in addition to the guiding bars 32, 33 also electric motors 20, 21, 22, 23.

In order to be able by remote control to pivot the manipulating bar 1, the manipulator is in conformity with the invention provided with two spacers 37, 38; 39; 40 which are offset relative to each other by an angle 36 or 90° and are spaced from flange 4 and from the outer cover 5, said spacers 37, 38; 39; 40 being journalled in universal joints. FIG. 2 shows the universal joints 41, 42 for the spacers 37, 38.

The spacers comprise a screw 37; 39 and a nut 38; 40. A universal joint each which is connected to one of the screws 37, 39, in FIG. 2 the universal joint 41, is adapted to be driven by one of the electric motors 22, 23. A turning of the screws 37, 39 results in an advantageous manner in an adjustment of the length of the spacer and thus in a pivoting of the manipulating bar within the high vacuum chamber.

With the manipulator according to the invention and usable for remote control, the manipulating bar 1 is in the same manner as the manually operable manipulator movable in all types of movements simultaneously by a simultaneous operation of all four electric motors. This represents a great advantage of the manipulator according to the invention. By means of this manipulator, the required movements of the manipulating bar can be carried out as integrated movements which fact greatly simplifies the handling of the manipulator and makes possible an optimum employment especially for transport manipulations of articles in a high vacuum chamber.

It is, of course, to be understood that the present invention is, by no means, limited to the specific showing in the drawings but also comprises any modifications within the scope of the appended claims.

What is claimed is:

1. A manipulator for use in manipulating articles within a controlled environment chamber having a wall; a flexible bellows, a flange sealingly connected to one end of said bellows and adapted for being sealingly connected to the chamber wall, an outer cover sealingly connected to the other end of the bellows, a ball in the bellows, a ball cup stationary on the chamber and supporting said ball, a manipulator rod slidable in the ball and having one end extending into said closed cover and the other end extending into said chamber, at least one of said ball and manipulator rod being rotatable on the axis of the said rod, a sleeve in said cover coaxial with said one end of said manipulator rod having one end sealingly connected to said other end of said bellows and the other end closed, magnetic means on said one end of said manipulator rod in said sleeve, magnet means in said cover movable therein along said sleeve and magnetically coupled to said magnetic means, first means for moving said magnet means axially along said sleeve to move said manipulator rod axially, second means for rotating said magnet means on the axis of said manipulator rod for rotating the said rod, and third means for tilting said cover and sleeve together with said manipulator rod about the geometric center of said ball.

2. A manipulator according to claim 1 in which said ball cup is in about the center of said bellows and includes a flange connected to the said wall of the chamber.

3. A manipulator according to claim 1 in which said magnetic means on said manipulator rod is covered with a high grade steel foil.

4. A manipulator according to claim 1 in which said third means comprises adjustable length spacer elements extending axially between said cover and said flange and spaced radially from the axis of said manipulator rod, and circumferentially spaced from one another about 90°, and swivel joints at each end of said spacer elements.

5. A manipulator according to claim 1 in which said first means comprises a threaded spindle in said cover parallel with the axis of said manipulator rod, and a carrier for said magnet means guided for axial movement along said sleeve and threadedly engaged by said spindle.

6. A manipulator according to claim 5 in which said magnet means is rotatable in said carrier and said second means comprises a ring gear on the magnet means and gear transmission engaging the ring gear and actuatable for rotating the magnet means in the carrier.

7. A manipulator according to claim 6 in which said transmission includes a pinion meshing with said ring gear, and a shaft in the cover parallel to the axis of said manipulator rod and slidably but nonrotatably engaging said pinion.

8. A manipulator according to claim 1 which includes electric motor means for actuating said first means and said second means and said third means for actuation of said manipulator rod in all directions by remote control.

* * * * *